United States Patent [19]
Mankovitz

[11] Patent Number: 5,915,026
[45] Date of Patent: *Jun. 22, 1999

[54] SYSTEM AND METHOD FOR PROGRAMMING ELECTRONIC DEVICES FROM A REMOTE SITE

[75] Inventor: Roy J. Mankovitz, Encino, Calif.

[73] Assignee: Gemstar Development Corporation, Pasadena, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/363,241

[22] Filed: Dec. 23, 1994

[51] Int. Cl.$^6$ ........................................................ H04L 9/00
[52] U.S. Cl. ............................ 380/49; 380/9; 379/102.03; 455/419
[58] Field of Search ............................... 380/9, 10, 23–25, 380/44, 49; 455/420, 419; 348/7, 164; 178/4.1 R; 341/176; 379/74, 102.01–102.03, 102.04

[56] References Cited

U.S. PATENT DOCUMENTS

| | | | |
|---|---|---|---|
| 4,790,012 | 12/1988 | Sutphin, Jr. | 380/21 |
| 4,819,267 | 4/1989 | Cargile et al. | 380/44 |
| 4,841,562 | 6/1989 | Lem | 379/104 |
| 4,918,439 | 4/1990 | Wozniak et al. | 340/825.69 |
| 5,038,374 | 8/1991 | Kaufman et al. | 379/98 |
| 5,091,942 | 2/1992 | Dent | 380/44 |
| 5,138,649 | 8/1992 | Krisbergh et al. | 379/56 |
| 5,201,067 | 4/1993 | Grube et al. | 455/420 |
| 5,228,077 | 7/1993 | Darbee | 379/102 |
| 5,410,326 | 4/1995 | Golstein | 348/7 |
| 5,414,756 | 5/1995 | Levine | 380/10 |
| 5,600,711 | 2/1997 | Yuen | 379/102 |
| 5,629,868 | 5/1997 | Tessier et al. | 348/164 |
| 5,638,444 | 6/1997 | Chou | 380/44 |

FOREIGN PATENT DOCUMENTS 2577054  8/1986  France.

OTHER PUBLICATIONS

Research Disclosure, No. 329, Sep. 1, 1991, p. 657, XP000226205 "Installation of Consumer Apparatuses".

*Primary Examiner*—Salvatore Cangialosi
*Attorney, Agent, or Firm*—Christie, Parker & Hale, LLP

[57] ABSTRACT

A system is provided for programming home electronic devices. The system includes a computer for converting information needed to program the electronic device which is communicated from the consumer to a representative at the site of the computer into data for programming the home electronic device. The computer communicates the programming data over telephone lines to a programming module at the consumer's location which receives the data communicated over the telephone lines from the computer. The programming module is then coupled to a home electronic device using a plug and socket, infrared link, AC line modulation or some other method of transferring data and the programming data communicated to the programming module from the computer is transferred to the home electronic device. The system is especially appropriate for data which must be programmed into a home electronic device as part of its initial setup.

46 Claims, 7 Drawing Sheets

SYSTEM AND METHOD FOR PROGRAMMING ELECTRONIC DEVICES FROM A REMOTE SITE

BACKGROUND OF THE INVENTION

In the electronic age, our homes are filled with various household electronic appliances. These range from computers to audio-visual equipment to thermostats to kitchen appliances. All of these electronic devices need to be set-up with initial information such as the current time of day and date and other information depending on the device.

The most common information that must be programmed into household appliances is the current time of day. Almost every household appliance that requires some programming or initial set up requires the consumer to enter the current time. Unfortunately, this seemingly simple process is not as simple as one would hope, as can be seen by how often comics and sitcoms base jokes on the infamous flashing "12:00" on consumer's VCRs.

Even so, the life of consumers would not be so bad if they only had to set the time on each of their household appliances once. However, every time the locality switches between standard and daylight savings time, every time the power goes out and every time an appliance gets unplugged, the consumer has to reprogram the time of day on each affected appliance. When an appliance has more data that has to be entered every time the power goes out, such as automatic sprinkler timers, this problem is magnified many fold.

SUMMARY OF THE INVENTION

The system and method embodying the present invention solve this problem by providing a programming module for receiving the setup information for a number of home electronics devices. The system provides a computer, operated by a programming assistant who consumers can call on the telephone. Consumers tell the programming assistant what appliances they use in their homes, the models and brands of these appliances and details regarding how these appliances should be programmed. The programming assistant enters this information into the computer. The computer generates codes containing setup information for the consumer's appliances that are downloaded over the telephone line to the programming module that the consumer holds near the earpiece of their telephone. The programming module is then connected, by a plug, infrared link or other type of connection, to the consumer's appliances one by one. When the programming module is connected to an appliance, it programs that appliance with set up information that was downloaded from the computer, such as the current date and time of day and other information depending on the appliance.

DETAILED DESCRIPTION

Figure 1:
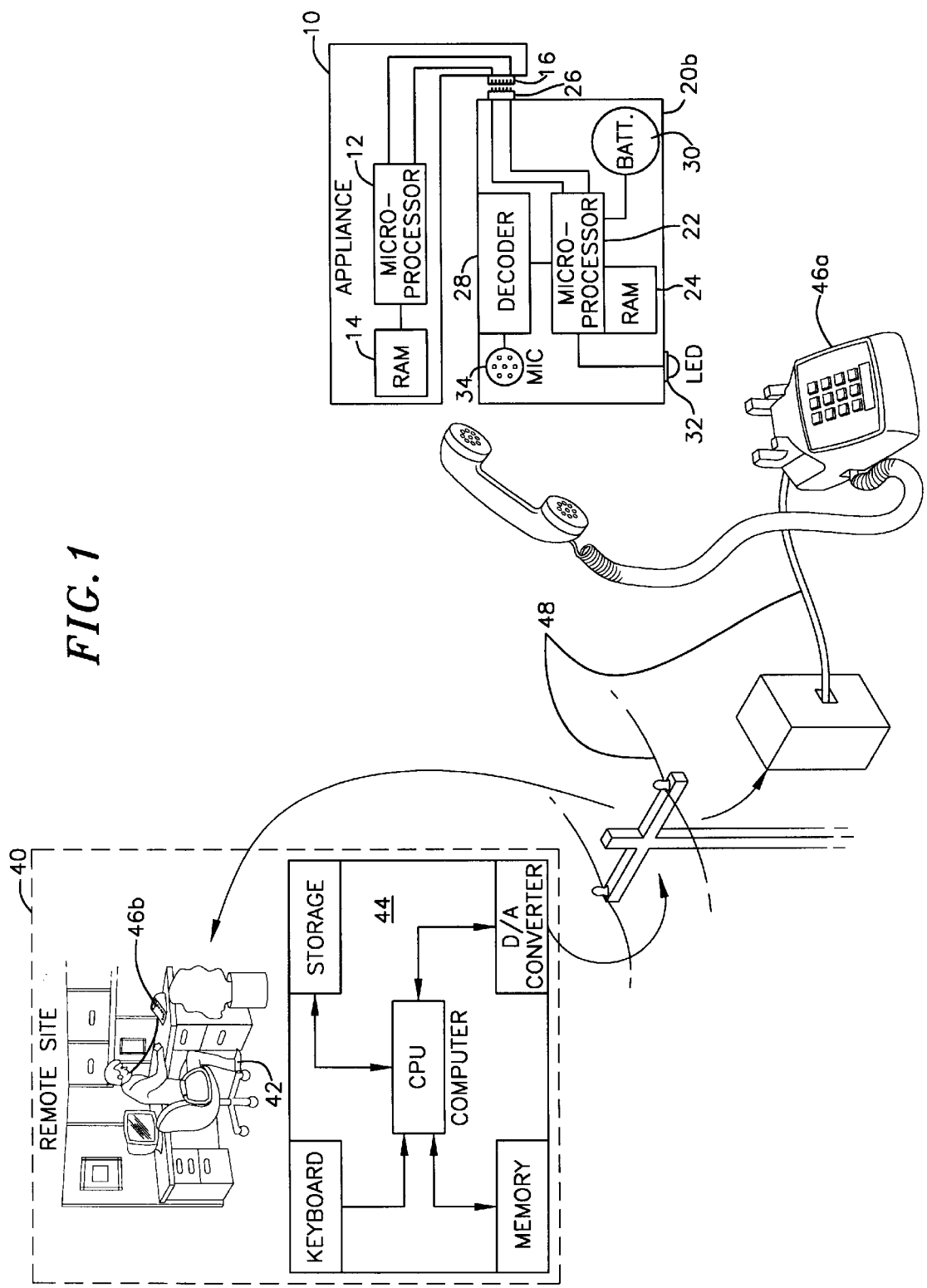
FIG. 1 is a block diagram schematic showing a system for appliance programming according to this invention.

FIG. 1 depicts a system embodying the present invention, for setting up a number of appliances in a consumer's home, such as appliance 10, includes a programming module 20, and a remote site programming center 40. Each appliance 10 includes an appliance microprocessor 12, an appliance memory 14 and a socket 16 connected to an I/O interface of the appliance microprocessor. The programming module 20 includes a module microprocessor 22 that is connected to a module random access (RAM) memory 24, a plug 26, an audio tone decoder 28, a battery 30 and an LED indicator 32. The audio tone decoder is further connected to a microphone 34.

The remote site programming center 40 provides work spaces for a number of household electronic appliance programming assistants ("programming assistants") 42. Each programming assistant is supplied with a computer 44. In various alternatives, the computer is either a stand alone microcomputer, a microcomputer connected to a computer network (not shown) or a terminal connected to a larger computer, such as a mainframe (not shown). Consumers and programming assistants communicate over standard telephones 46a and 46b and telephone lines 48.

The computer 44 includes a real time clock that keeps track of the current time of day and the date. The computer can convert this real time into the correct real time for any locality, even those in different time zones when certain information, such as the state or ZIP code is entered into the computer. The computer also includes a database which contains information regarding a variety of consumer appliances. Each appliance is referenced by brand, model number, appliance type, features and descriptions of the exterior appearance. The data stored for each appliance depends on the type of information that can be programmed into that particular model and brand of appliance.

Listed below are a variety of household appliances that might be programmed with the programming module system and examples of what type of information is stored in the computer 44 of the present system.

Setback Thermostats: There are commercially available thermostats that are generally programmed to set the temperature of the thermostat at different temperatures at different times of day. For example, a consumer, on weekdays in the winter, may generally want the thermostat to be set to 68° during the time between 6:00 until 8:00 a.m. and between 6:00 and 11:00 p.m., but set to 58° during the other times of the day. During the weekends in winter, a consumer may want the thermostat to be set at 68° from 8:00 a.m. until midnight and at 58° between midnight and 8:00 a.m. Thus, the thermostats generally allow at least two different programs to be programmed at once. The consumer can select between these programs for use on particular days of the week. Some programmable thermostats allow programming in even more detail. Of course, the thermostat must be programmed with and keep track of the current time of day and the day of the week. When the weather turns warmer, consumers often reprogram their thermostat with temperatures for controlling an air conditioner. During the weekdays the thermostat may be programmed at 78° between 6 p.m. until 6 a.m. and 88° between 6 a.m. until 6 p.m. Unfortunately, the change in seasons is not predictable and there are often times when the consumer may have to change between an air conditioning schedule and a heating schedule several times during the months in the spring and fall. The present system allows the consumer to easily perform this reprogramming by simply making a phone call, holding a programming module to the phone and then connecting the programming module to the thermostat.

Automatic Sprinklers: Automatic sprinklers often can be programmed with such information as what days of the week to water, how long to leave each set of sprinklers on for and what time of day to water. As with the thermostat, changes in the seasons force periodic reprogramming of this information.

House Light Timers: House light timers are programmed to turn on and off one or more lights within a house at programmed times. Many of these timers also included dimming functions. Thus, the brightness of lights may also be programmable.

Programmable Telephones: Many telephones, including cellular phones may be programmed with a number of phone numbers that are dialed by the consumer pressing a limited number of keys. Many of these phones also have the ability to store alphanumerics names with the phone numbers.

Answering Machines: Besides the programming of any features found in telephones (see above), answering machines often have other programmable features, such as setting the number of rings before the answering machine answers, using a "toll-saver" feature that answers after a different number rings depending on whether there is a message on the answering machine and setting a time limit on how long of a message the answering machine will record.

Clocks/Clock Radios: Most modern houses contain countless appliances that have electronic clocks that must be set every time the power goes off or the time switches between daylight savings and standard time. Further, clock radios have one or more alarm times that must be programmed.

Fax Machines: Like many phones, fax machines often store a number of speed dial numbers and sometimes associated alphanumeric names. Further, fax machines usually must be programmed with header information that appears at the top or bottom of every page sent by the fax machine. This header information usually includes the phone number from which the fax machine is sending the fax, and some alphanumeric identification of the individual or company who owns the fax machine.

Based on information provided to a programming assistant by a consumer, the data needed to program the consumer's electronic devices are downloaded from computer 44, over standard telephone lines 48, to the programming module 20. The programming data is carried over the telephone lines using a series of audio tones that are emitted from the consumer's telephone 46a and received by the microphone 34 in the programming module. The programming module is then connected to each of the electronic devices, such as appliance 10, by the consumer inserting plug 26 into socket 16. In order for plug 26 to be compatible with all appliances equipped with this programming system, socket 16 must be a universal type of socket that is the same on every appliance to be used with the system. The programming data for the appliance that the programming module is connected to is then downloaded from the module memory 24 to the appliance memory 14, completing the programming of the appliance.

Figure 2:
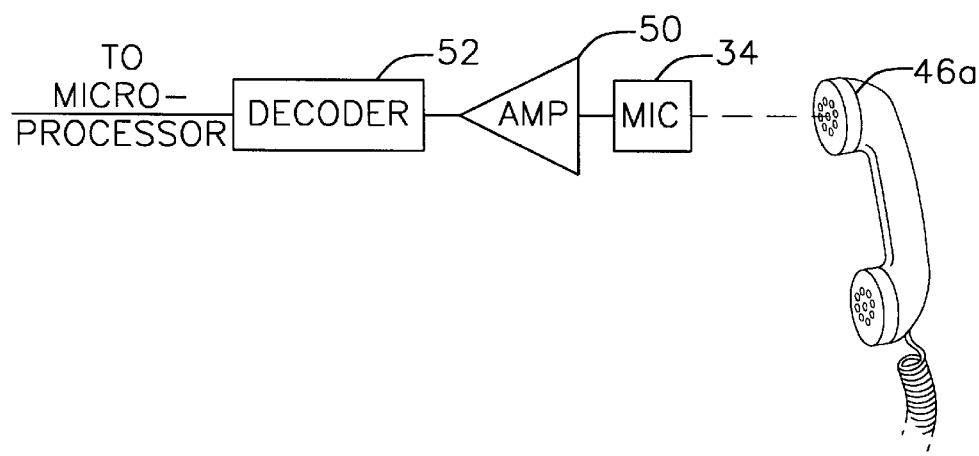
FIG. 2 is a block diagram schematic of one embodiment of the audio tone decoder shown in FIG. 1.
Figure 3:
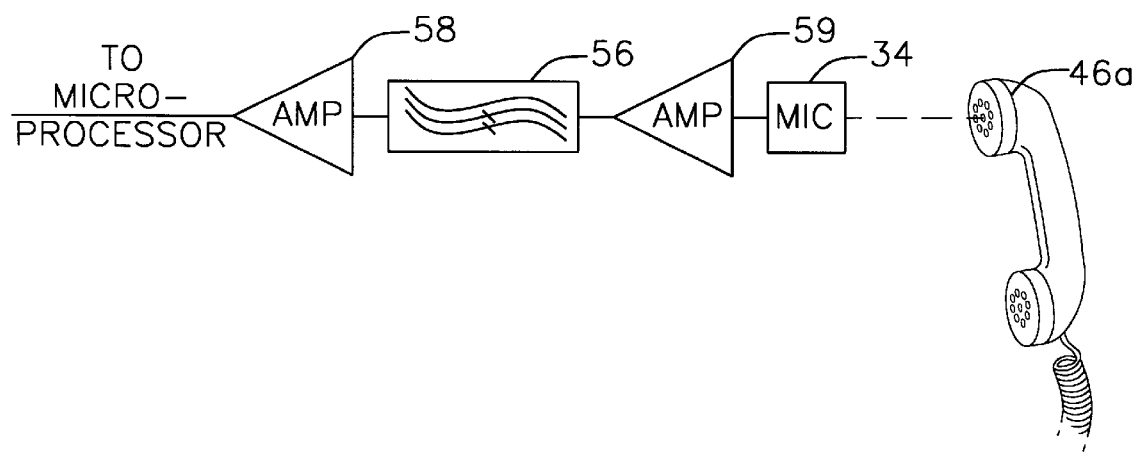
FIG. 3 is a block diagram schematic of an alternate embodiment of the audio tone decoder shown in FIG. 2.

In the embodiment shown in FIG. 1, alternate embodiments of the decoder 28 and microphone 34 combination are shown in FIGS. 2 and 3. FIG. 2 shows a combination with an amplifier 50 which leads into a DTMF decoder 52. DTMF tones are received by the microphone 34 from the receiver 46a. Each DTMF tone is amplified and decoded by amplifier 50 and DTMF decoder 52 to produce the numerical value represented by the DTMF tone. Depending on the specific type of DTMF decoder which is utilized, either a serial or parallel representation of the decoded numeric value is sent to an I/O input of the microprocessor 22 of the programming module 20.

The microphone and decoder assembly shown in FIG. 3 is less expensive than the assembly shown in FIG. 2 that uses a DTMF decoder 52, but the data transfer rate is slower. The system shown in FIG. 3 utilizes just two single frequency signals rather than many dual frequency signals as in the DTMF system shown in FIG. 2. The first signal, a tone of approximately 3000 Hz, is used to signify a binary "one" and the second signal, a tone of approximately 500 Hz, is used to signify "zero." The telephone earpiece 46a generates a stream of these audio signals, which are then picked up by microphone 34. The signals are passed through amplifier 59, through high pass filter 56 and sent through a final amplifier 58. The bandwidth of the high pass filter 56 is 1000–5000 Hz, to include just the "one" tone of approximately 3000 Hz. The output of the final amplifier 58 is connected to an I/O port of the microprocessor 22.

A series of these two tones are transmitted over the telephone line, representing a binary series. A short period of no signal is included between each tone in the series of tones so that two consecutive 500 Hz or two consecutive 3000 Hz signals are interpreted as two sequential signals and not one long signal. In an alternative embodiment, the series of signal tones are sent at a predetermined clock speed.

A decoder (not shown) is included between the microphone and decoder assembly shown in FIG. 3 and the microprocessor 22 that converts the 3000 Hz signals to high electrical signals and converts the 500 Hz signals to low electrical signals that are sent to a serial input into the microprocessor. The decoder also sends a clock signal simultaneously sent to the microprocessor with each high or low signal.

Figure 4:
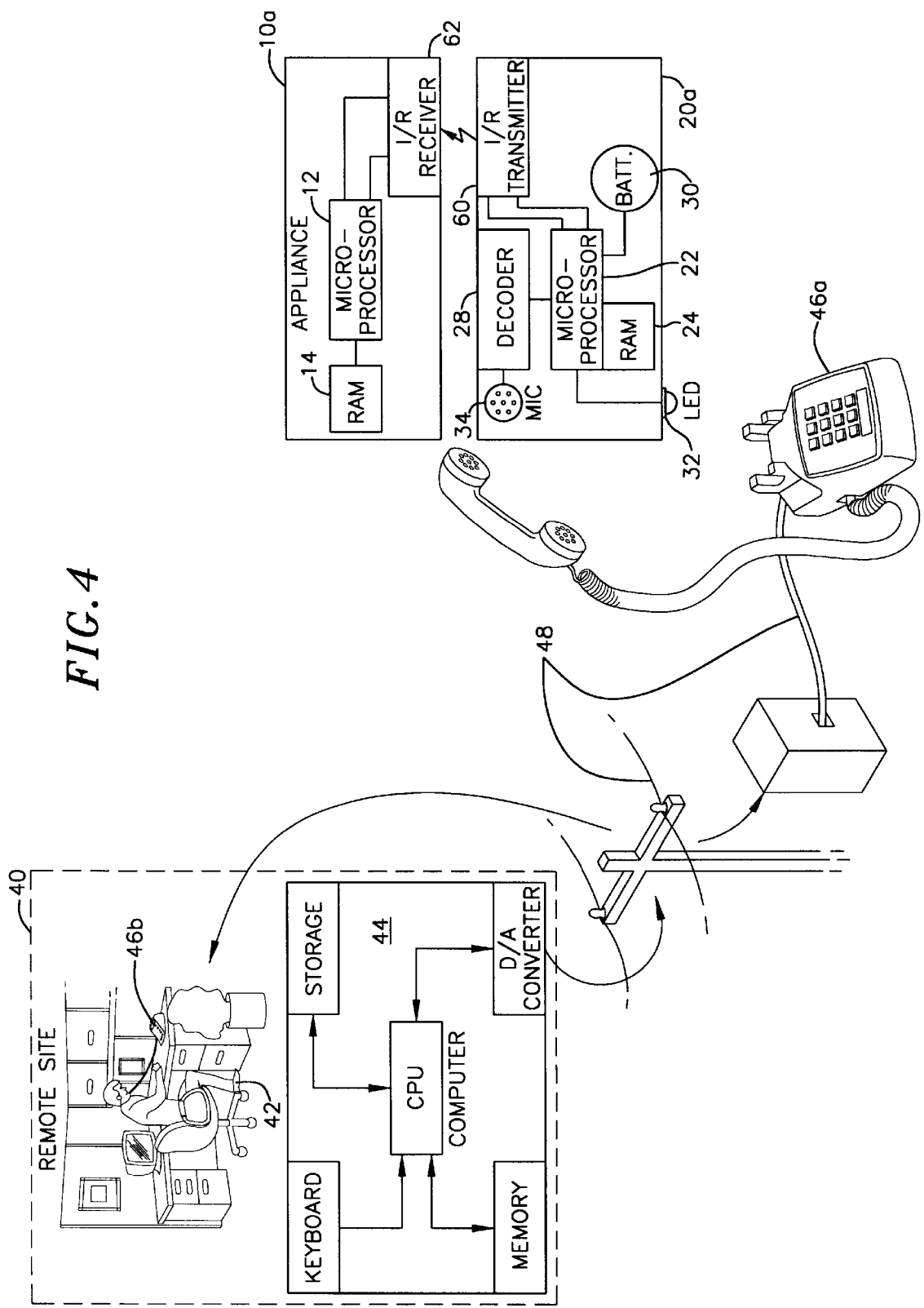
FIG. 4 is a block diagram schematic showing an alternative embodiment of the system shown in FIG. 1.

In an alternative embodiment, shown in FIG. 4, the plug 26 in the programming module 20 and the socket 16 in the appliance 10 are replaced by IR transmitter 60 in the programming module 20a and IR receiver 62 in the appliance 10a, respectively. In this embodiment, instead of the programming data being downloaded from the module memory 24 to the appliance memory 14 through a plug and socket connection, the programming data is downloaded from the module memory 24 to the appliance memory 14 using the IR link between the programming module and the appliance created by IR transmitter 60 and IR receiver 62.

The use of an IR link in the alternative embodiment shown in FIG. 4 allows further flexibility in packaging the programming module. For example, the IR programming module 20a can be combined with telephone 46a, eliminating the microphone 34, which can increase the reliability and speed of the data downloading from computer 44. This combination is possible because the telephone/IR programming module combination does not have to be physically connected to each appliance as is the case with the programming module 20 shown in FIG. 1. In the same way, the IR programming module can be combined with any device that is connected to a telephone line, such as an answering machine, fax machine or personal computer. The only difference in the audio tone data transfer method from the computer 44 to the programming module in these embodiments is that a special "attention" tone needs to precede the rest of the data so that the telephone or device connected to a telephone line is alerted that data is to be decoded from the following audio tones. One limitation to the telephone/IR programming module combination is that there has to be a direct line of sight from the telephone to each appliance to be programmed. This does present a problem if the appliance to be programmed is in a different room than the telephone/IR programming module combination.

A solution to this problem is to combine the IR programming module with a cordless telephone or radio frequency transmitting and receiving device. In this arrangement, the cordless telephone/IR programming module combination can be moved to be with a direct line of sight with any appliance that is to be programmed. This packaging arrangement also provides most or all of the hardware necessary to implement a universal remote control in the cordless telephone/IR programming module combination. Various embodiments of such a combination of a cordless telephone and universal remote control is disclosed in more detail in application Ser. No. 08/332,994, entitled "Universal Remote with Built-in Phone and VCR Plus", filed on Nov. 1, 1994, which is hereby incorporated by reference as if fully set forth herein.

Figure 5:
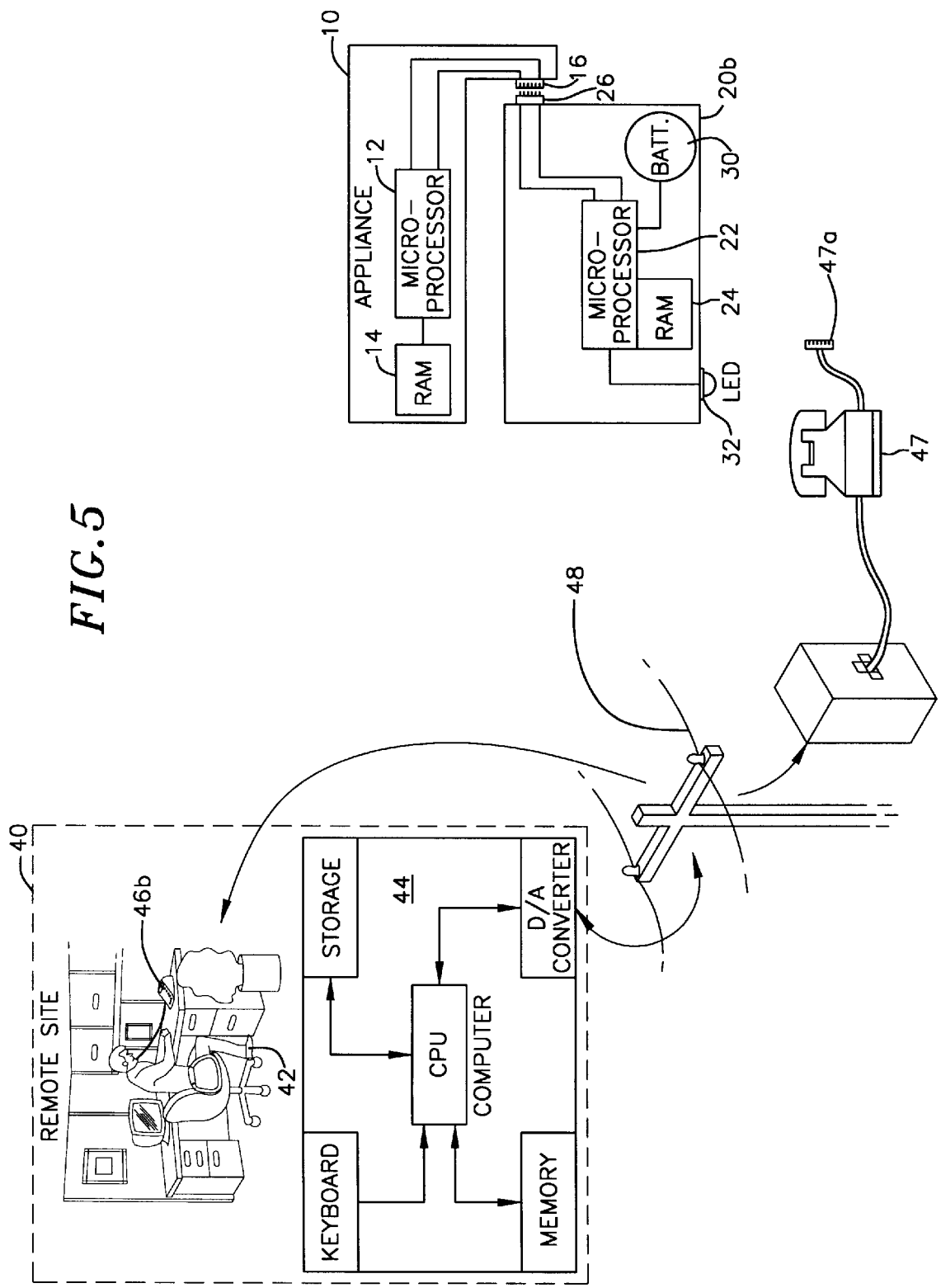
FIG. 5 is a block diagram schematic showing a second alternative embodiment of the system shown in FIG. 1.

Another solution to this problem is solve by the embodiment shown in FIG. 5. The system shown in FIG. 5 is the same as the system shown in FIG. 1, except that the telephone 46a in FIG. 1 is replaced with telephone 47 in FIG. 5 and programming module 20b does not include the microphone 34 or decoder 28. Telephone 47 is equipped with a socket 47a of the same type as socket 16. Thus, programming module can be connected, with plug 26, to telephone 47 through socket 47a. This configuration allows the flexibility of being able to have the telephone located remotely from the appliances being programmed, but at the same time save hardware costs by removing the microphone and decoder from the programming module 20.

Another advantage of any of the telephone/programming module combinations is that data which is stored in the telephone/module memory can be communicated back to the central computer 44. This feature is discussed in more detail in the discussion of FIG. 8 below. It is noted that any of the embodiments shown in FIGS. 1 and 4 discussed above and FIG. 6 below can be modified to include two-way communication links of various forms know to those skilled in the art. On such modification involves replacing the microphone 34 with a combination microphone/speaker.

Figure 6:
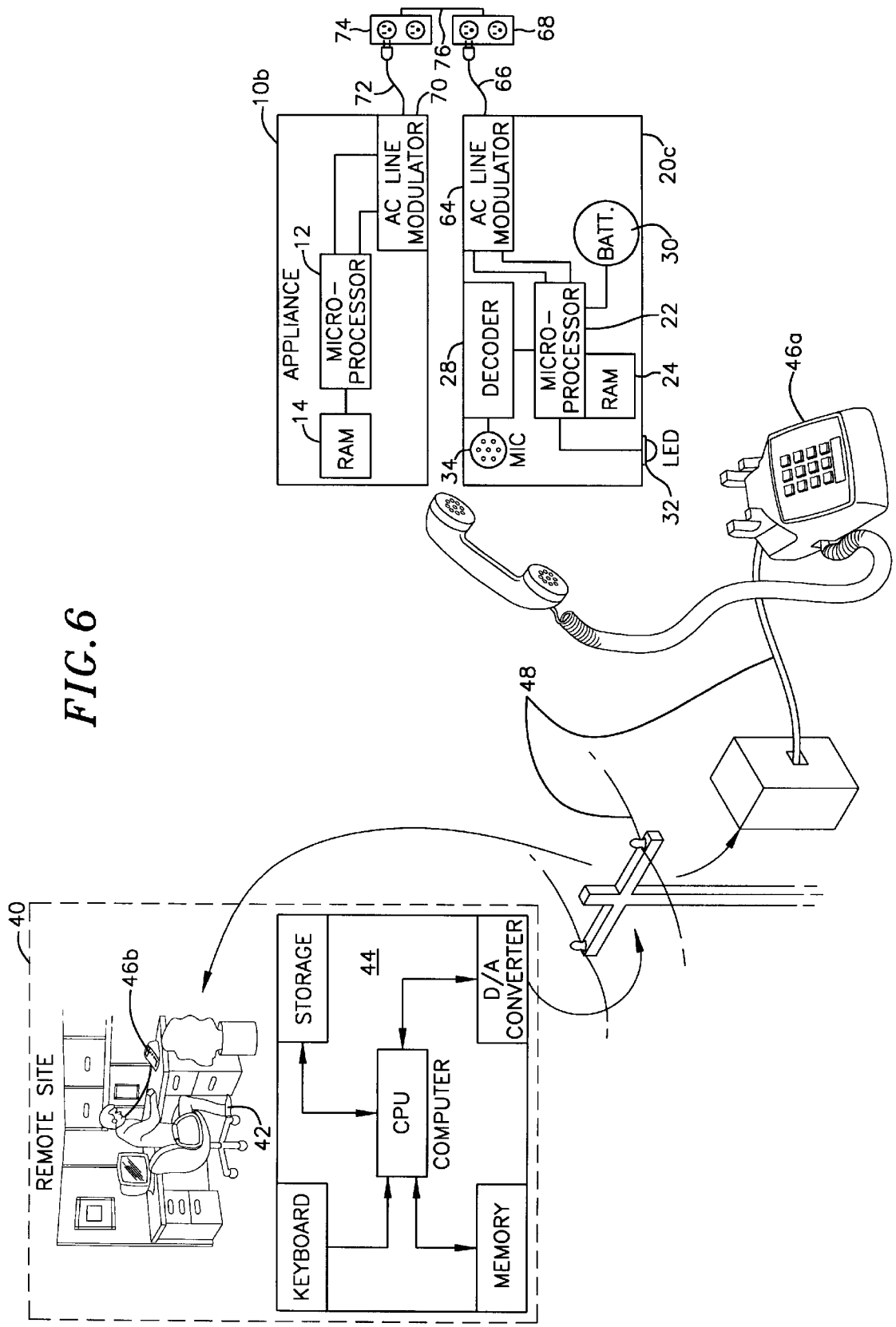
FIG. 6 is a block diagram schematic showing a third alternative embodiment of the system shown in FIG. 1.

In a further alternative embodiment, shown in FIG. 6, the plug 26 in the programming module 20 and the socket 16 in the appliance 10 shown in FIG. 1 are replaced by module AC line modulator 64 in programming module 20c and appliance AC line modulator 70 in appliance 10b, respectively. The module AC line modulator is connected to the module AC power cord 66 supplying power to the programming module which is, in turn, connected to a standard AC wall outlet 68. The appliance AC line modulator is connected to appliance AC power cord 72 which is, in turn, connected to standard AC wall outlet 74. AC wall outlets 68 and 74 are connected to each other through standard AC house wiring 76. In this embodiment, instead of the programming data being downloaded from the module memory 24 to the appliance memory 14 through a plug and socket connection, the programming data is downloaded from the module memory 24 to the appliance memory 14 using the well known technique of AC line modulation. One technique for transmitting signals on AC lines is described in more detail in U.S. Pat. No. 4,418,33 to Schwarzbach, et al., issued Nov. 29, 1983 the disclosure of which is hereby incorporated by reference as if set forth fully herein.

In yet another embodiment (not shown) the programming module can be provided with an appliance. In this embodiment, the module microprocessor 22 and module memory 24 can be used as the appliance microprocessor 12 and appliance memory 14 when the programming module is plugged into the appliance. This embodiment saves the apparent duplication of components in the embodiments shown in FIGS. 1, 4, 5 and 6, but requires that the programming module be plugged into its appliance for the appliance to operate.

Figure 7:
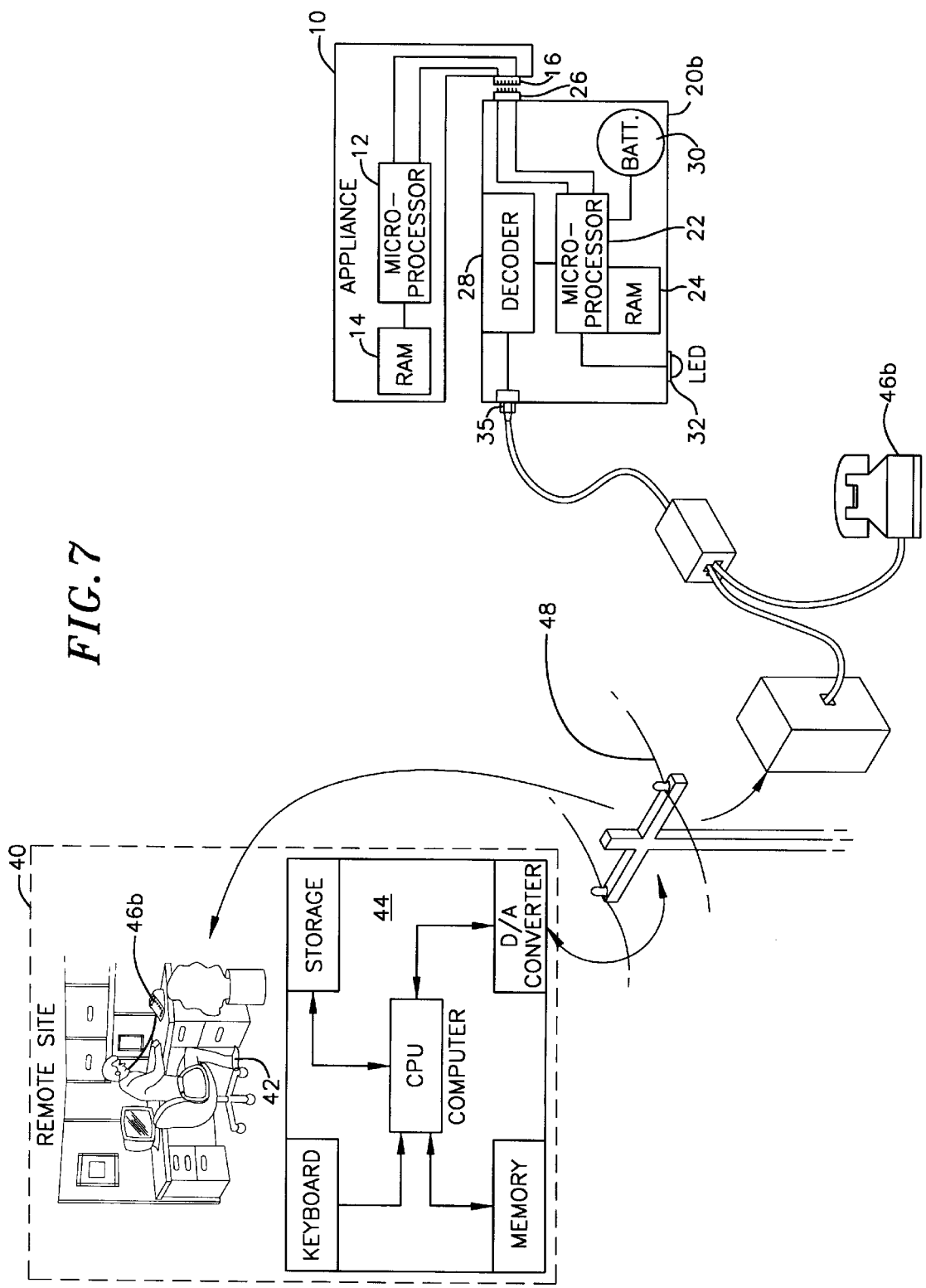
FIG. 7 is a block diagram schematic showing a fourth alternative embodiment of the system shown in FIG. 1.

In another embodiment, shown in FIG. 7, the use of telephones 46a and 47 shown in FIGS. 1 and 4–6 in the downloading of data to the programming module 20d is eliminated by replacing the microphone 34 in FIGS. 1 and 4–6 with modular telephone socket 35. A telephone 46b is still necessary in the system, however, for the consumer to communicate orally with the customer service representative as discussed more fully below in connection with FIG. 8.

Figure 8:
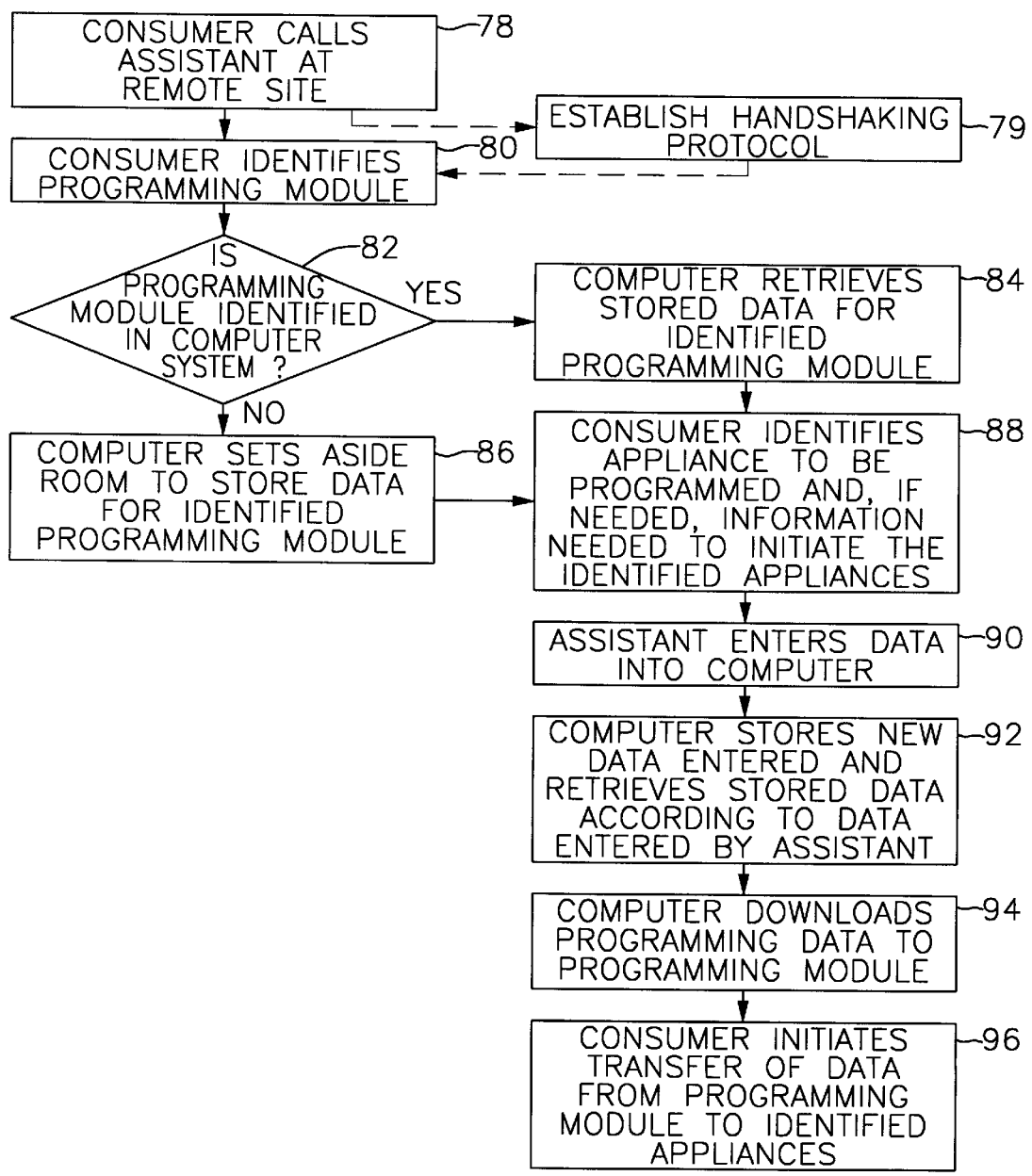
FIG. 8 is a flow diagram of a method of using the embodiments shown in FIGS. 1–7.

The utilization of the programming system is shown in the flow diagram of FIG. 8. To begin, in block 78, a consumer will call the remote site programming center 40 over standard telephone lines 48. The telephone number for the remote site programming center can be a normal toll number, a toll-free "800" number or a fee per call or fee per minute "900" number. In block 80, the user identifies the programming module by reading an unique identification number that is imprinted onto each programming module. The programming assistant then enters this identification number into the computer 44. In block 82, the computer then determines if the identification number has been used before with the system. If the identification number has been used before, the computer will retrieve all the information that has been previously given to the programming assistants by a consumer using that identification number and stored in the computer. On the other hand, if the programming module is being used for the first time, the identification number will not be found in the computer's storage and the computer, in block 86, sets asides a record in its storage for information regarding this new programming module.

It is important to store the programming module identification numbers and information given by the consumer so that future programming and communication between the consumer and the programming assistant are easier. For example, a consumer may have an electronic setback thermostat which he or she programs using a programming module. The first time the consumer uses the system, in the summer, the consumer provides a summer/air conditioning type thermostat schedule to the programming assistant, who in turn helps the consumer use his or her programming module to program the setback thermostat. A typical temperature for the thermostat during the summer may be 80°. When the first cold snap of the coming winter occurs, the consumer will want to change the programming on the setback thermostat to control the heater instead of the air conditioner. A common thermostat setting during this time may be 68°. The consumer may utilize the system to make this programming change. Because the previous programming information has been stored in the computer, the programming assistant need not get certain information from the consumer, like the brand and model of the setback thermostat to be programmed using the programming module. When the winter settings are given by the consumer, they are stored in the computer. Meanwhile, the summer settings are not discarded, but remain stored in the computer. This is because the consumer may want to revert to a summer/air conditioning thermostat program when a relatively hot spell occurs only weeks after the first cold snap. If all past programming information for that programming module is stored, the consumer can simply ask the programming assistant to change the thermostat back to summer/air conditioning settings.

In the alternative embodiments described above in which the programming modules 20, 20a, 20b, 20c or 20d are connected to the programming computer 44 with a two-way communication link, such as when the programming module is combined or connected directly with a telephone or other device that includes a wired telephone interface such as an answering machine, fax machine or personal computer (e.g., FIGS. 5 and 7 ) or the microphone in FIGS. 1, 4 and 6 are replaced with speaker/microphones, before step 80, in step 79, a simple handshaking protocol is employed so that both the computer and the programming module are in synchrony as to which device is transmitting audio tones and which device is receiving audio tones. Once this two way communication link and handshaking protocol is established, the steps shown in blocks 80 through 86 can be fully automated since some or all of the information provided by the consumer to the programming assistant in these blocks, including the programming module identification number, can be stored in the module memory. Further, all of the previous programming information that is normally stored by the computer 44 in its storage can be stored instead in the memory of the programming module/telephone. Most newer telephones and especially answering machines, fax machines and personal computers have large amounts of memory and there would not be an impediment to storing the previous programming information in this memory instead of at the central computer 44.

Returning to the general case, the thermostat example above is also useful in illustrating the step that occurs in block 88. In block 88, the user identifies the appliances that the user wants to have programmed. If a particular identified appliance has been previously programmed using the system, the programming assistant will inform the user of the previous ways that appliance has been programmed. In this case, the user may choose to have the appliance programmed in one of these previous ways or may provide new or supplemental information to facilitate programming the appliance. If a particular identified appliance is being programmed for the first time, the programming assistant will help the user provide enough information to allow the programming of the appliance as the user wishes.

In any of the embodiments employing a two-way communication link with the computer 44, as much of the information provided by the consumer to the programming assistant in block 88 as is contained in the memory of the programming module can be automatically uploaded to the computer 44. This information includes the brand and model of telephone-connected device with which the programming module is combined to facilitate the programming of that device. Further, the programming module and the appliances are preferably programmed so that before any data is downloaded from the computer 44, plugging the programming module into an appliance will cause the appliance to transfer appliance identification information, such as brand and model number into the programming module so that this information can automatically be uploaded to computer 44 in step 88.

In block 90, the programming assistant enters the selection of stored information about the identified appliance or enters the information needed to program the appliance as desired into the computer. In the two-way communication embodiments, this step is limited to entering information that is not uploaded from the programming module to the computer 44 in step 88. According to the entered information, in block 92, the computer retrieves stored information if such stored information is selected and stores new information when new information is entered. From the retrieved information or the new information, the computer generates the necessary programming data and downloads this data, in block 94, through the standard telephone lines 48 to the programming module.

In block 96, the user transfers the programming data that has been just downloaded to the programming module to the identified appliances. The precise manner in which this transferring is done depends on the embodiment of programming module being used. In the embodiment shown in FIG. 1, the user plugs the programming module into the identified appliance. The transfer of data in this case can be initiated by a variety of ways. One way is to have either the programming module or each appliance constantly send an attention signal through either plug 26 or socket 16, respectively. The other device (the appliance or the programming module, respectively) will then be set to continuously scan its socket or plug for the attention signal. When the attention signal is detected, the device receiving the attention signal then returns a "receive" signal and any of the myriad of handshaking protocols can be employed to transfer the data.

Another way to initiate the transfer of the data is to have buttons or switches on both the programming module and the appliance which are both activated once the plug 26 is inserted into the socket 16. These buttons or switches may be designed so that the user activates them, or, as in a preferred embodiment, the switches are included with the plug 26 and socket 16, so that the initiation of the transfer of data occurs automatically when the programming module is plugged into the appliance.

In the embodiments shown in FIGS. 4 and 6, the communication link between the programming module and the appliances to be programmed is for the most part permanent. In the case of the IR link shown in FIG. 4, the only thing that must happen before the communication link is established is that the programming module be position with a line of sight to the appliance to be programmed. In either case, the appliances usually are waiting at all times to receive commands or data through their IR receivers or their AC line demodulators. Thus, to initiate the transfer of data, the user must first indicate to the programming module which appliance is to be programmed and then cause the programming module to begin the transfer. The selection of the appliance to be programmed can be performed in manners well known in the art, including providing an LCD display on the programming module which is capable of displaying appliance description, scroll up and down keys. The programming module can be caused to begin the transfer by the operation of a "Transfer" key or control on the programming module.

Regardless of the technique used to initiate the downloading of data from the programming module to the appliance, a confirmation signal is given to the consumer when the downloading is complete. In the embodiments shown in FIGS. 1 and 4–7, the confirmation is given by causing LED 32 to flash. In the alternative embodiment discussed above where the microphone 34 is replaced with a combination microphone/speaker so that a two-way communication link can be established, LED 32 is removed and confirmation is given by an audio tone generated by the microphone/speaker after the downloading is complete.

In another embodiment of programming module 20, 20a, 20b, 20c and 20d, the programming module includes a real time clock. The clock is implemented with the module microprocessor 22, module memory 24 and battery 30. Implementing a clock in the programming module allows the consumer to use the programming module to download just the real time to each of his or her electronic appliances at any time. The clock of the programming module need only be set once with the assistance of a programming assistant. After that, the battery will allow the clock to keep accurate time. A capacitor or additional battery backup may be provided to allow the user to change worn out batteries without having to reset the clock.

In another embodiment, the data downloaded from the computer 44 to the programming modules 20, 20a, 20b, 20c and 20d is encrypted to prevent unauthorized use of the programming system. The programming modules of this embodiment include a description circuit or a set of microprocessor instructions stored in memory that would contain the description technique being utilized. If the programming modules include a real time clock as described above, the encryption key can be based on real time. Thus, once the real time is downloaded from the computer 44, all subsequent data can be encrypted using a real time based encryption technique.

In yet another embodiment, each set of programming data downloaded from the computer 44 would have the current date embedded in the programming data. This allows the programming data to have a limited lifespan. This is accomplished by including a feature in the programming module that prevents the downloading of programming data with an embedded date that is more than a predetermined number of days, such as a week, away from the current date.

It is thought that the system and method of programming household appliances of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A system for programming an electronic device comprising:
   means for converting information needed to program said electronic device into programming data for said electronic device, said means for converting comprising means for receiving said information needed to program said electronic device;
   means for embedding the date on which the programming data has been converted into the programming data as an embedded date;
   means for communicating said programming data from said means for converting information to a programming module;
   means for linking said programming module to said electronic device;
   means for transferring said programming data from said programming module to said electronic device through said means for linking; and
   means for preventing the means for transferring from operating if the embedded date is more than a predetermined period of time previous to a present date.

2. The system of claim 1 wherein said means for receiving comprises a telephone.

3. The system of claim 1 wherein said means for communicating comprises a telephone link utilizing a series of coded audio tones.

4. The system of claim 3 which further comprises said programming module comprises a telephone.

5. The system of claim 3 wherein said programming module comprises a cordless telephone.

6. The system of claim 1 wherein:
   said programming module comprises a plug;
   said electronic device comprises a socket; and
   said means for linking comprises said plug and said socket.

7. The system of claim 1 wherein:
   said programming module comprises a remote control transmitter;
   said electronic device comprises a remote control receiver; and
   said means for linking comprises said remote control transmitter and said remote control receiver.

8. The system of claim 7 wherein:
   said remote control transmitter comprises an infrared transmitter; and
   said remote control receiver comprises an infrared receiver.

9. The system of claim 8 wherein said programming module comprises a cordless telephone.

10. The system of claim 9 wherein said programming module comprises a universal remote control transmitter.

11. The system of claim 7 wherein:
    said remote control transmitter comprises an AC line modulation transmitter; and
    said remote control receiver comprises an AC line modulation receiver.

12. A system for programming an electronic device comprising:
    means for converting information needed to program said electronic device into programming data for said electronic device, said means for converting comprising:
      means for receiving said information needed to program said electronic device; and
      means for encrypting said programming data using an element of real time as an encryption key;
    means for communicating said programming data from said means for converting information to a programming module;
    means for linking said programming module to said electronic device;
    means for transferring said programming data from said programming module to said electronic device through said means for linking; and
    means for preventing the means for transferring from operating.

13. A system for programming a plurality of electronic devices comprising:
    means for converting information needed to program a selected set of said electronic devices into programming data for said selected set of electronic devices, said means for converting comprising means for receiving said information needed to program said selected set of electronic devices;
    means for embedding the date on which the programming data has been converted into the programming data as an embedded date;
    means for communicating said programming data from said means for converting information to a programming module;

means for separately linking said programming module to each of said selected electronic devices;

means for transferring said programming data from said programming module to each of said selected electronic devices through said means for separately linking; and means for preventing the means for transferring from operating if the embedded date is more than a predetermined period of time previous to a present date.

14. The system of claim 13 wherein said means for receiving comprises a telephone.

15. The system of claim 13 wherein said means for communicating comprises a telephone link utilizing a series of coded audio tones.

16. The system of claim 15 wherein said programming module comprises a telephone.

17. The system of claim 15 wherein said programming module comprises a cordless telephone.

18. The system of claim 13 wherein:

said programming module comprises a plug;

each of said selected electronic devices comprises a socket, wherein each of said sockets are connectable to said plug; and said means for separately linking comprises said plug and each of said sockets.

19. The system of claim 13 wherein:

said programming module comprises a remote control transmitter;

each of said selected electronic devices comprises a remote control receiver; and said means for separately linking comprises said remote control transmitter and each of said remote control receivers.

20. The system of claim 19 wherein:

said remote control transmitter comprises an infrared transmitter; and said remote control receivers comprise infrared receivers.

21. The system of claim 20 wherein said programming module comprises a cordless telephone.

22. The system of claim 21 wherein said programming module comprises a universal remote control transmitter.

23. The system of claim 19 wherein:

said remote control transmitter comprises an AC line modulation transmitter; and said remote control receivers comprise AC line modulation receivers.

24. A system for programming a plurality of electronic devices comprising:

means for converting information needed to program a selected set of said electronic devices into programming data for said selected set of electronic devices, said means for converting comprising:

means for receiving said information needed to program said selected set of electronic devices; and means for encrypting said programming data using an element of real time as an encryption key;

means for communicating said programming data from said means for converting information to a programming module;

means for separately linking said programming module to each of said selected electronic devices;

means for transferring said programming data from said programming module to each of said selected electronic devices through said means for separately linking; and means for preventing the means for transferring from operating.

25. The method of programming an electronic device comprising the steps of:

communicating information needed to program said electronic device from the location of said electronic device to a remote programming site converting said information into programming commands for said electronic device;

embedding the date on which the programming data has been converted into the programming data as an embedded date;

downloading said programming commands from said remote programming site to said electronic device only if the embedded date is more than a predetermined period of time before a present date.

26. The method of claim 25 wherein the step of communicating comprises communicating said information using a telephone connection.

27. The method of programming an electronic device comprising the steps of:

communicating information needed to program said electronic device from the location of said electronic device to a remote programming site;

converting said information into programming commands for said electronic device, wherein said step of converting comprises the step of encrypting said programming commands using an element of real time as an encryption key; and downloading said programming commands from said remote programming site to said electronic device, wherein said step of downloading comprises the step of decrypting said programming commands.

28. The method of programming an electronic device comprising the steps of:

establishing a communication link between a consumer and a programming assistant;

communicating information needed to program said electronic device from the consumer to the programming assistant;

converting said information into programming commands for said electronic device;

embedding the date on which the programming data has been converted into the programming commands as an embedded date;

downloading said programming commands to a programming module;

establishing a data linking between said programming module and said electronic device; and transferring said programming data from said programming module to said electronic device only if the embedded date is more than a predetermined period of time before a present date.

29. The method of claim 28 wherein the step of communicating comprises communicating said information using a telephone connection.

30. The method of claim 29 wherein said programming module comprises a telephone.

31. The method of claim 29 wherein said programming module comprises a cordless telephone.

32. The method of claim 28 wherein said step of establishing a data link comprises establishing a plug and socket connection between said programming module and said electronic device.

33. The method of claim 28 wherein said step of establishing a data link comprises establishing a remote control connection between said programming module and said electronic device.

34. The method of claim 33 wherein said step of establishing a data link by establishing a remote control connection comprises establishing a data link by establishing an infrared remote control connection.

35. The method of claim 34 wherein said programming module comprises a telephone.

36. The method of claim 34 wherein said programming module comprises a cordless telephone.

37. The method of claim 33 wherein said step of establishing a data link by establishing a remote control connection comprises establishing a data link by establishing an AC line modulation remote control connection.

38. The method of programming an electronic device comprising the steps of:

establishing a communication link between a consumer and a programming assistant;

communicating information needed to program said electronic device from the consumer to the programming assistant;

converting said information into programming commands for said electronic device, said step of converting comprising the step of encrypting said programming commands using an element of real time as an encryption key;

downloading said programming commands to a programming module, said step of downloading comprising the step of decrypting said programming commands;

establishing a data linking between said programming module and said electronic device; and transferring said programming data from said programming module to said electronic device.

39. An appliance programming module for programming a variety of home electronic appliances comprising:

means for receiving at least one set of appliance programming data with a date on which the programming data has been received being embedded within the programming data for at least one of said appliances;

means for coupling said appliance programming module to one of said appliances;

means for transferring said at least one set of appliance programming data to said one of said appliances; and means for preventing the means for transferring from operating if the embedded current date is more than a predetermined period of time before a present date.

40. The appliance programming module of claim 39 wherein the means for coupling comprise a standardized plug.

41. The appliance programming module of claim 39 wherein the means for coupling comprise an infrared transmitter.

42. The appliance programming module of claim 39 wherein the means for coupling comprise an AC line modulator.

43. The appliance programming module of claim 39 wherein the means for receiving comprise a microphone and a decoder.

44. The appliance programming module of claim 39 wherein the appliance programming module comprises a telephone wherein said means for receiving comprise said telephone.

45. The appliance programming module of claim 39 further comprising means for transmitting programming information for generating said programming data.

46. The appliance programming module of claim 45 wherein the means for transmitting programming information comprise means for transmitting programming information including identification information for said one of said appliances.

* * * * *